(12) United States Patent
Rempel et al.

(10) Patent No.: US 9,657,113 B2
(45) Date of Patent: *May 23, 2017

(54) HYDROGENATION OF A DIENE-BASED POLYMER LATEX

(71) Applicant: UNIVERSITY OF WATERLOO, Waterloo (CA)

(72) Inventors: Garry L. Rempel, Waterloo (CA); Qinmin Pan, Waterloo (CA); Yin Liu, Mississauga (CA); Jialong Wu, Waterloo (CA)

(73) Assignee: University of Waterloo, Waterloo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/408,593

(22) PCT Filed: Jun. 21, 2013

(86) PCT No.: PCT/IB2013/001319
§ 371 (c)(1),
(2) Date: Dec. 17, 2014

(87) PCT Pub. No.: WO2013/190373
PCT Pub. Date: Dec. 27, 2013

(65) Prior Publication Data
US 2015/0183892 A1    Jul. 2, 2015

(30) Foreign Application Priority Data

Jun. 22, 2012 (EP) .................................. 12173165

(51) Int. Cl.
*C08C 19/02* (2006.01)
*C08F 36/04* (2006.01)
*C08F 236/12* (2006.01)

(52) U.S. Cl.
CPC ............. *C08C 19/02* (2013.01); *C08F 36/04* (2013.01); *C08F 236/12* (2013.01)

(58) Field of Classification Search
CPC .................................. C08C 19/02; C08F 8/04
See application file for complete search history.

(56) References Cited

U.S. PATENT DOCUMENTS

| | | |
|---|---|---|
| 3,454,644 A | 7/1969 | Dewhirst |
| 4,452,950 A | 6/1984 | Wideman |
| 5,021,469 A | 6/1991 | Langerbeins et al. |
| 5,039,737 A | 8/1991 | Parker et al. |
| 5,057,581 A | 10/1991 | Rempel et al. |
| 5,087,676 A | 2/1992 | Heider et al. |
| 5,272,202 A | 12/1993 | Kubo et al. |
| 5,340,858 A | 8/1994 | Bauer et al. |
| 5,414,193 A | 5/1995 | Taylor et al. |
| 5,436,289 A | 7/1995 | Aydin et al. |
| 5,442,009 A | 8/1995 | Parker et al. |
| 5,496,882 A | 3/1996 | Aydin et al. |
| 5,498,655 A | 3/1996 | Aydin et al. |
| 5,624,992 A | 4/1997 | Aydin et al. |
| 5,705,571 A | 1/1998 | Tsiang et al. |
| 5,708,077 A | 1/1998 | Noelken et al. |
| 5,756,574 A | 5/1998 | Baumstark et al. |
| 5,994,457 A | 11/1999 | Stanger et al. |
| 6,020,439 A | 2/2000 | Ko et al. |
| 6,403,727 B1 | 6/2002 | Leube et al. |
| 6,410,657 B1 | 6/2002 | Ko et al. |
| 6,552,132 B2 | 4/2003 | Belt et al. |
| 6,566,457 B2 | 5/2003 | Barghoom et al. |
| 6,635,718 B2 | 10/2003 | Belt et al. |
| 6,696,518 B1 * | 2/2004 | Dersch .................... C08C 19/02 524/449 |
| 6,838,489 B2 | 1/2005 | Bell et al. |
| 7,585,920 B2 | 9/2009 | Guerin |
| 7,803,883 B2 | 9/2010 | Pan et al. |
| 7,951,875 B2 | 5/2011 | Guerin et al. |
| 9,150,669 B2 | 10/2015 | Ong et al. |
| 2006/0211827 A1 | 9/2006 | Rempel et al. |

FOREIGN PATENT DOCUMENTS

| | | | |
|---|---|---|---|
| JP | 2001288212 A | | 10/2001 |
| JP | 2003126698 A | | 5/2003 |
| WO | WO 2011/029732 | * | 3/2011 |

OTHER PUBLICATIONS

Kongparakul, Applied Catalysis A: General, 405 (2011) 129-136.*
Houben-Weyl, Methoden der Organischen Chemie, Makromolekulare Stoffe, Band XIV/1, 1961, Georg Thieme Verlag, Stuttgart, Germany, pp. 192-208.
Mingotaud, Anne-Francoise, et al., "Characterization of the Micellar Ring Opening Metathesis Polymerization in Water of a Norbornene Derivative Initiated by Hoveyda-Grubbs' Catalyst", Journal of Polymer Science: Part A: Piolymner Chemistry, vol. 46, 2008, Wiley Periodicals, Inc., Hoboken, New Jersey, USA, pp. 2833-2844.
Rempel, Garry L., et al., "Hydrogenation of nitrile-butadiene rubber latex with diimide" Applied Catalysis A: General 276 (2004), Elsevier, Amsterdam, Netherlands, pp. 123-128.
Rempel, Garry L., et al., "Gel Formation in Diimide-Hydrogenated Polymers", Journal of Applied Polymer Science, vol. 96 (2005), Wiley Periodocals, Inc., Hoboken, New Jersey, USA, pp. 1122-1125.
Guo, Xiang-Yao, et al., "Catalytic Hydrogenation of Nitrile-Butadiene Copolymer Emulsion", Department of Chemical Engineering, University of Waterloo, Waterloo, Ontario N2L 3G1, Canada, 1997, John Wiley & Sons, Inc., Hoboken, New Jersey, USA, pp. 667-675.
Mudalige, D. Chandrika, et al., "Aqueous-phase hydrogenation of polybutadiene, styrene-butadiene, and nitrile-butadiene polymer emulsions catalyzed by water-soluble rhodium complexes", Journal of Molecular Catalysis A: Chemical 123 (1997) Elsevier Science B.V., Amsterdam, Netherlands, pp. 15-20.
(Continued)

*Primary Examiner* — Robert C Boyle

(57) ABSTRACT

The present invention provides a novel process for selectively hydrogenating the carbon-carbon double bonds in diene-based polymers which are present in latex form, this means as a suspension of diene-based polymer particles in an aqueous medium, using a Ruthenium or Osmium-based complex catalyst without any organic solvent.

10 Claims, No Drawings

(56) References Cited

OTHER PUBLICATIONS

Singha, Nikhil K., et al., "A New Method to Hydrogenate Nitrile Rubber in the Latex Form", Rubber Chemistry and Technology, vol. 68, 1994, American Chemical Society, Washington, DC, USA, pp. 281-286.

Kotzabasakis, Vasilis, et al., "Catalytic conversions in aqueous media: a novel and efficient hydrogenation of polybutadiene-1, 4-block-poly(ethylene oxide) catalyzed b y Rh/TPPTS complexes in mixed micellar nanoreactors", Journal of Molecular Catalysis A: Chemical 231 (2005), Elsevier, Amsterdam, Netherlands, pp. 93-101.

Wei, Zhenli, et al., "Direct Catalytic Hydrogenation of an Acrylonitrile-Butadiene Rubber Latex Using Wilkinson's Catalyst", Macromol. Rapid Commun., 2005, 26, Wiley-VCH Verlag GmbH & Co., KGaA, Weinheim, Germany, pp. 1768-1772.

Trnka, Tina M., et al., The Development of L2X2Ru==CHR Olefin Metathesis Catalysts: An Organometallic Success Story:, Acc. Chem. Res. 2001, 34, American Chemical Society, Washington, DC, USA pp. 18-29.

McClain, S.J., et al., "New Routes to Ester and Acid Functionalized Polyethylene", Polymeric Materials Science and Engineering (1997), 76 American Chemical Society, Washington, DC, USA pp. 246-247.

Malacea, Raluca, et al., "Renewable materials as precursors of linear nitrile-acid derivatives via cross-metathesis of fatty esters and acids with acrylonitrile and fumaronitrile", Green Chem, 2009, 11, The Royal Society of Chemistry, London, United Kingdom, pp. 152-155.

Korshak, Yuri et al., "Intra- and Intermolecular Metathesis Reactions in the Formation and Degradation of Unsaturated Polymers", Journal of Molecular Catalysis, 15 (1982), Elsevier Sequoia, Amsterdam, Netherlands, pp. 207-218.

Wagener, Kenneth B., et al., "Solvent-Free Olefin Metathesis Depolymerization of 1, 4-Polybutadiene", Macromolecules 2000, 33, American Chemical Society, Washington, DC, USA pp. 1494-1496.

Ullmann's Ency. of Ind. Chem, 5th Ed., vol. A21, 1993, Wiley-VCH Verlag GmbH & Co., KGaA, Weinheim, Germany, pp. 372-393.

Kongparakul, Suwadee, et al., "Metathesis hydrogenation of natural rubber latex", Applied Catalysis A: General 405 (2011), Elsevier, Netherlands, pp. 129-136.

Solanky, Shailendra Singh, et al., "Metathetic Selective Degradation of Polyisoprene: Low-Molecular-Weight Telechelic Oligomer Obtained from Both Synthetic and Natural Rubber", Macromol. Chem. Phys, 2005, 206, Wiley-Vch Gerlag GmbH & Co., KGaA, Weinheim, Germany, pp. 1057-1063.

International Search Report from International application No. PCT/IB2013/001319, dated Oct. 18, 2013, 2 pages.

European Search Report from European application No. 12173165, dated Dec. 17, 2012, 3 pages.

* cited by examiner

HYDROGENATION OF A DIENE-BASED POLYMER LATEX

FIELD OF THE INVENTION

The present invention relates to a process for selectively hydrogenating the carbon-carbon double bonds in diene-based polymers which are present in latex form, this means as a suspension of diene-based polymer particles in an aqueous medium, using a ruthenium- or osmium-based metathesis catalyst without any organic solvent.

BACKGROUND OF THE INVENTION

It has been known that carbon-carbon double bonds in polymers may be successfully hydrogenated by treating the polymer in an organic solution with hydrogen in the presence of different catalysts. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations e.g. based on cobalt, nickel, rhodium, ruthenium, osmium, and iridium. The suitability of the catalyst depends on the extent of hydrogenation required, the rate of the hydrogenation reaction and the presence or absence of other groups, such as carboxyl and nitrile groups, in the polymers.

Hydrogenation of diene-based polymers has been very successful, if the polymers were dissolved in an organic solvent as e.g. disclosed in U.S. Pat. No. 6,410,657, U.S. Pat. No. 6,020,439, U.S. Pat. No. 5,705,571, U.S. Pat. No. 5,057,581, and U.S. Pat. No. 3,454,644.

However, many diene-based polymers, -copolymers or -terpolymers are made by emulsion polymerization processes and are therefore obtained in latex form, i.a. as polymer particles suspended in the aqueous medium due to the stabilizing effect of emulsifiers, when they are discharged from polymerization reactors. Therefore it is very desirable to directly hydrogenate a diene-based polymer in said latex form and increasing efforts are spent on such direct hydrogenation in the recent decade.

So far significant attention has been paid to the hydrogenation of C=C bonds using hydrazine or a derivative of hydrazine as a reducing agent together with an oxidant like oxygen, air or hydrogen peroxide. The hydrogen source to saturate the C=C bonds is then generated in-situ as a result of the redox reactions in which diimide is also formed as intermediate.

In U.S. Pat. No. 4,452,950 the latex hydrogenation is performed using the hydrazine hydrate/hydrogen peroxide (or oxygen) redox system to produce diimide in situ. $CuSO_4$ or $FeSO_4$ is used as a catalyst.

U.S. Pat. No. 5,039,737 and U.S. Pat. No. 5,442,009 provide a more refined latex hydrogenation process which treats the hydrogenated latex with ozone to break the cross-linked polymer chains which form during or after the latex hydrogenation using the diimide approach.

U.S. Pat. No. 6,552,132 discloses that specific compounds, if added before, during or after the latex hydrogenation serve to break cross-links formed during the hydrogenation using the diimide hydrogenation route. The specific compound can be chosen from primary or secondary amines, hydroxylamine, imines, azines, hydrazones and oximes.

U.S. Pat. No. 6,635,718 describes the process for hydrogenating C=C bonds of an unsaturated polymer in the form of an aqueous dispersion by using hydrazine and an oxidizing compound in the presence of a metal compound containing a metal atom in an oxidation state of at least 4 (such as Ti(IV), V(V), Mo(VI) and W(VI)) as the catalyst.

In Applied Catalysis A-General Vol. 276, no. 1-2, 2004, 123-128 and Journal of Applied Polymer Science Vol. 96, no. 4, 2005, 1122-1125 detailed investigations relating to the hydrogenation of nitrile butadiene rubber latex via the diimide hydrogenation route are presented which cover examining hydrogenation efficiency and degree of hydrogenation. It has been found that there are side reactions at the inter phase of the latex particles and within the polymer phase, which generate radicals to initiate the cross-linking of polymers in the latex form. Using radical scavengers did not show any evidence in helping to suppress the degree of gel formation.

Although there are methods developed to reduce the cross-linking, the aforementioned diimide route still encounters gel formation problem, especially when high hydrogenation conversion is achieved. Therefore, the resulting hydrogenated rubber mass is difficult to process or is unsuitable for further use because of its macroscopic three dimensional cross-linked structure.

U.S. Pat. No. 5,272,202 describes a process for the selective hydrogenation of the carbon-carbon double bonds of an unsaturated, nitrile-group-containing polymer with hydrogen in the presence of a hydrogenation catalyst being a palladium compound. In this process an aqueous emulsion of the unsaturated, nitrile-group-containing polymer is subjected to the hydrogenation and additionally an organic solvent capable of dissolving or swelling the polymer is used at a volume ratio of the aqueous emulsion to the organic solvent in a range of from 1:1 to 1:0.05. The aqueous emulsion is brought into contact with gaseous or dissolved hydrogen while maintaining an emulsified state.

U.S. Pat. No. 6,403,727 discloses a process for selectively hydrogenating ethylenically unsaturated double bonds in polymers. Said process involves reacting the polymers with hydrogen in the presence of at least one hydrogenation catalyst selected from the salts and complex compounds of rhodium and/or of ruthenium, in an aqueous suspension of the polymers which comprises up to 20% by volume of an organic solvent. The suitable rhodium containing catalysts are rhodium phosphine complexes of the formula $RhX_mL^3L^4(L^5)_n$ wherein X is a halide, the anion of a carboxylic acid, acetylacetonate, aryl- or alkylsulfonate, hydride or the diphenyltriazine anion and $L^3$, $L^4$ and $L^5$ independently are CO, olefins, cycloolefins, dibenzophosphol, benzonitrile, $PR_3$ or $R_2P$-A-$PR_2$, m is 1 or 2 and n is 0, 1 or 2, with the proviso that at least one of $L^3$, $L^4$ or $L^5$ is one of the above mentioned phosphorus-containing ligands of the formula $PR_3$ or $PR_2$-A-$PR_2$, wherein R is alkyl, alkyloxy, cycloalkyl, cycloalkyloxy, aryl or aryloxy. U.S. Pat. No. 6,566,457 makes use of the same principal technology of hydrogenating a polymer in latex form in the presence of a ruthenium and/or rhodium containing catalyst in order to prepare graft polymers.

JP 2001-288212 describes a further process for hydrogenating diene-based polymer latices. Latices of 2-chloro-1, 3-butadiene (co)polymers are mixed with solutions or dispersions of catalysts in organic solvents which dissolve or swell the (co)polymers, and then contacted with hydrogen. The catalysts used are the so-called Wilkinson-catalysts having the formula $MeCl_a(P(C_6H_5)_3)_b$ wherein Me is a transition-metal, Cl is chlorine, b is an integer and equal to or bigger than 1 and a+b is an integer less than or equal to 6. In the Examples a latex of poly(2-chloro-1,3-butadiene) rubber having a $T_g$ of −42° C. and an average number weight molecular weight $M_n$ of 150,000 was added to a toluene solution containing $RhCl(PPh_3)_3$ and $Ph_3P$, and hydrogenated at 100° C. and 5.0 MPa for 2 hours to give a hydrogenated polymer with $T_g$=−54° C. and $M_n$=120,000.

In the Journal of Applied Polymer Science, Vol. 65, no. 4, 1997, 667-675, two processes for the selective hydrogenation of the C=C bonds in nitrile-butadiene rubber ("NBR") emulsions are described, which are carried out in the presence of a number of $RuCl_2(PPh_3)_3$ complex catalysts. One of the processes is carried out in a homogeneous system, in which an organic solvent, which can dissolve the NBR polymer and the catalyst and which is compatible with the emulsion, is used.

The other process is carried out in a heterogeneous system, in which an organic solvent, which is capable of dissolving the catalyst and swelling the polymer particles but is not miscible with the aqueous emulsion phase, is used. Both processes can realize quantitative hydrogenation of the C=C double bonds with the help of a certain amount of organic solvent to dissolve or swell the polymers.

U.S. Pat. No. 6,696,518 teaches a process for selective hydrogenation of non-aromatic C=C and C≡C bonds in polymers with hydrogen in the presence of at least one hydrogenation catalyst comprising ruthenium and/or rhodium and at least one nonionic phosphorus compound capable of forming a coordinative compound with the transition metal wherein the hydrogenation catalyst is incorporated into the aqueous dispersion of the polymer without adding a solvent. Ru and/or Ru complexes or Ru and/or Ru salts are used as catalysts. Examples of preferred nonionic phosphorus compound are $PR_3$ or $R_2P(O)_xZ(O)_yPR_2$ [R represents e.g. $C_{1-10}$ alkyl, $C_{4-12}$ cycloalkyl, $C_{1-10}$ alkoxy, aryl(oxy) and F; Z is a bivalent hydrocarbon residue; x, y=0, 1]. For this special case, an acrylic acid-butadiene-styrene copolymer latex was prepared by radical polymerization of a mixture of monomers containing also ruthenium(III) tris-2,4-pentanedionate, which means the Ru salt was dispersed into monomer aqueous solution as the catalyst precursor before the polymerization. After having obtained the aqueous polymer dispersion, $Bu_3P$ was added to the latex. The system was stirred for 16 h at ambient temperature followed by hydrogenation at severe conditions for 30 hours at 150° C. and 280 bar. The catalyst was thereby synthesized in-situ, therefore no organic solvent was used to transport the catalyst. The hydrogenation is carried out in aqueous dispersions instead of in an organic medium, although the in-situ synthesized catalyst is oil-soluble. However, the operating procedure of U.S. Pat. No. 6,696,518, i.e. adding the catalyst precursor to the monomer mixture before the polymerization takes place, is associated with some problems, including that the catalyst precursor may have a negative effect on the polymerization and that some of the catalyst precursor might get deactivated during the polymerization.

In J. Molecular Catalysis Vol. 123, no. 1, 1997, 15-20 it is reported on the hydrogenation of polybutadiene (PBD), as well as polymers having styrene-butadiene repeating units (SBR) or having nitrile-butadiene repeating units (NBR) which are present in emulsions. Such hydrogenation is catalyzed by water-soluble rhodium complexes like e.g. $[RhCl(HEXNa)_2]_2$ ($HEXNa=Ph_2P—(CH_2)_5—CO_2Na$) and $RhCl(TPPMS)_3$ (TPPMS=monosulphonated-triphenylphosphine). The process, however, is carried out in the presence of some organic solvent. Under the conditions employed the catalyst is extracted into the organic phase during reaction. This is attributed to the phase transfer properties of the complex which is rendered by the amphiphilic HEXNa ligand.

In Rubber Chemistry and Technology Vol. 68, no. 2, 1995, 281-286 it is described to use a water-soluble analog of the Wilkinson catalyst, i.e. $RhCl(TPPMS)_3$ (where TPPMS represents monosulphonated-triphenylphosphine), for hydrogenation of nitrile rubber latex without any organic solvent. The hydrogenation occurs under mild conditions (1 atm of hydrogen pressure, 75° C.) without coagulation of the latex, and up to 60 percent hydrogenation can be achieved. It is recognized that the hydrogenation was accompanied by an increase in gel content of the latex.

JP 2003-126698 discloses a process for hydrogenating unsaturated polymer latices using a water soluble catalyst containing group VIII metals or their compounds and hydrophilic organic phosphine ligands in the absence of organic solvents. In the process as disclosed in the Examples, 0.133 mmol (as Rh) chloro(1,5-cyclooctadiene)rhodium dimer was stirred with 0.372 mmol of $P(C_6H_4SO_3Na)_3$ to generate an aqueous solution of the complex catalyst. One part of such catalyst solution was mixed with five parts of butadiene rubber latex without organic solvent for hydrogenation. However, the highest degree of hydrogenation is only about 56% which is unsatisfactory for a scale-up to larger production volumes.

In the Journal of Molecular Catalysis, A: Chemical, Vol 231, no. 1-2, 2005, 93-101 it is reported to perform an aqueous phase hydrogenation of polybutadiene-1,4-block-poly(ethylene oxide) (PB-b-PEO) by using water-soluble Rh/TPPTS complexes. The hydrogenation can be successful only because the PB-b-PEO has water-soluble parts within its polymer chains. In such a hydrogenation system, mixed micelles are formed by mixing the amphiphilic PB-b-PEO with added cationic surfactant dodecyl trimethyl ammonium chloride (DTAC) and n-hexane. Hydrogenation conversion can go up to 100% after one hour catalyzed by Rh/TPPTS complexes ([Rh]=10 ppm or less in aqueous phase) generated in situ from $RhCl_3.3H_2O$ and TPPTS under 80 to 100° C. and 20 bar of $H_2$. Their recycling experiment showed that the catalytic activity of the anionic catalytic system, Rh/P $(C_6H_4\text{-}m\text{-}SO_3—)_3$, remained high in a consecutive run. The success of this hydrogenation system is mainly due to the fact that PB-b-PEO is an amphiphilic starting material. Therefore, the water-soluble catalyst works for systems which have the amphiphilic polymer material.

In summary, several technical routes have been attempted to hydrogenate C=C double bonds in polymers in the form of latex, which include using hydrazine or a derivative of hydrazine as a reducing agent together with an oxidant like oxygen, air or hydrogen peroxide, directly using oil-soluble catalysts accompanied with a certain amount of organic solvents, and using catalysts containing water-soluble ligands. The hydrazine relevant route has encountered a significant gel formation problem, especially when a high hydrogenation conversion is required, and gel formation is not desired for post processing operations. In all the prior art references relevant to using oil-soluble catalysts, a certain amount of organic solvents is still required in order to achieve a reasonable hydrogenation rate. The route using water-soluble catalysts has also encountered significant difficulty in overcoming the cross-linking problem.

In US 2006/0211827 A1 a process for selectively hydrogenating nitrile-butadiene rubber latex without organic solvent is disclosed in which $RhCl(PPh_3)_3$ is used as catalyst and $PPh_3$ is used as co-catalyst. The catalyst is added as pure material or in a small amount of organic solvent. This process can achieve high degrees of hydrogenation and does not show gel formation. However, this method requires long reaction times and high loading of the transition metal for synthesis of the catalyst. Zhenli Wei et al. in Macromol. Rapid Commun. Vol 26, 2005, 1768-1772 reported that the activity of the catalyst in NBR latex hydrogenation was very low (TOF<28 h$^{-1}$) as it was in a heterogeneous aqueous micelles system.

In EP 2075263 A1 a process for hydrogenation of NBR latex was disclosed using a RhCl(PPh$_3$)$_3$ as catalyst which was in-situ synthesized from a water soluble rhodium salt together with PPh$_3$. The motivation of this work was to develop an improved technique for the direct hydrogenation of diene-based polymer latex. Although the RhCl(PPh$_3$)$_3$ could be in-situ synthesized without using the pre-made solid catalyst, the low catalyst synthesis efficiency in the NBR latex greatly affected its activity for hydrogenation.

In the last decade, ruthenium carbene complexes have found extensive use in olefin metathesis, for example, by T. M. Trnka, R. H. Grubbs in Acc. Chem. Res. 2001, 34, 18. Meanwhile, these catalysts also showed to be an effective catalyst for hydrogenation reactions. Tandem metathesis-hydrogenation processes using single ruthenium carbene complexes of the Grubbs-type RuCl$_2$(=CHR)(PR'$_3$)$_2$ as catalysts were developed. For instance, McLain et al. in Proc. Am. Chem. Soc.; Div. Polym. Mater. Sci. Eng. 1997, 76, 246 have reported the synthesis of an ethylene/methylacrylate copolymer by the ROMP of an ester-functionalized cyclooctene using RuCl$_2$(=CHCH=CPh$_2$)(PCy$_3$)$_2$, followed by the application of hydrogenation to completed ROMP reaction at 135° C. Dixneuf et al. in Green Chemistry, 2009, 11, 152 synthesized nitrile acid derivatives and alcohols by tandem metathesis hydrogenation of ester and acrylonitrile and cross metathesis hydrogenation of aldehydes.

Although some scientific research of synthetic rubber metathesis has been reported in the literature, such reports were mainly covering metathetic degradation. For example, Dimitry F. Kutepov et al. in J. Mol. Catal. 1982, 15, 207 disclosed the metathetic cyclodegration of cis-polyisoprene to low molecular weight oligomers, and the co-metathesis of cis-polyisoprene with linear olefins to yield linear cis-oligomers was carried out using W[OCH(CH$_2$Cl)$_2$]$_2$Cl$_4$—AlEt$_2$Cl-anisole as a catalyst.

W. B. Wagener et al. in Macromolecules 2000, 33, 1494 reported that the well defined ruthenium catalyst, Cl$_2$(Cy$_3$P)$_2$ RuCHPh, effected the clean metathesis depolymerization of high molecular weight solid 1,4-polybutadiene at room temperature.

J-F. Pilard et al. in Macromol. Chem. Phys., 2005, 206, 1057 reported the degradation studies of cis-1,4-polyisoprene using first and second generation Grubbs catalysts to achieve end-functionalized acetoxy oligomers in both an organic solvent and a latex phase at room temperature. Well-defined acetoxy telechelic polyisoprene structures were obtained in a selective manner with a range of M$_n$ from 10,000 to 30,000, with a polydispersity index of around 2.5.

In WO2002/100941 A1 a process for preparing a hydrogenated nitrile rubber in an organic solvent is disclosed. In one embodiment of the reaction a nitrile rubber is subjected to metathetic degradation in a first step. Such metathesis is performed in organic solution using a Ruthenium- or Osmium based complex catalyst containing at least one carbene ligand like e.g. Grubbs II catalyst to achieve the decrease of the molecular weight of the initial nitrile rubber. Then, in a second step, however, without isolating the degraded nitrile rubber the reaction mixture is treated with hydrogen. In the presence of hydrogen Grubb's II catalyst is converted to a dihydride complex (PR$_3$)$_2$RuCl$_2$H$_2$, which is itself acts as an olefin hydrogenation catalyst and provides a high degree of hydrogenation. Thus, in a one-pot reaction a low molecular hydrogenated nitrile rubber can be obtained. However, this method occurred in an organic solution of the nitrile rubber. As the preparation of nitrile rubber is mostly conducted by water based emulsion polymerisation such type of reaction requires the isolation of the nitrile rubber after polymerisation prior to subjecting it to metathesis and hydrogenation which decreases the commercial attractiveness of the whole process.

WO 2005/080456 A describes the preparation of a hydrogenated nitrile rubber by hydrogenating nitrile rubber with a simultaneously occurring metathetic degradation of the nitrile rubber. Such process is conducted in the presence of a Ruthenium- or Osmium based complex catalyst containing at least one carbene ligand like e.g. Grubbs II catalyst and in an organic solvent, too. This process therefore suffers the same drawback as the process of WO2002/100941 A1 with regard to the necessary isolation of the nitrile rubber after the polymerisation reaction. Additionally it may be difficult to control two different activities, i.e. the metathetic and the hydrogenation activity of the catalyst and therefore to obtain hydrogenated nitrile rubber with reproducible molecular weights and hydrogenation degree.

The object of the present invention was to provide a process for selectively hydrogenating carbon-carbon double bonds in diene-based polymers which are present in latex form, i.e. as suspension of diene-based polymer particles in an aqueous medium, without the need of organic solvents and with a catalyst showing a high catalytic activity therefore resulting in a hydrogenated diene-based polymer present in an aqueous suspension with a high degree of hydrogenation within very short reaction times.

SUMMARY OF THE INVENTION

The present invention provides a process for selectively hydrogenating carbon-carbon double bonds in a diene-based polymer comprising subjecting the diene-based polymer which is present in a suspension in an aqueous medium to a hydrogenation in the presence of a catalyst of the general formula (A)

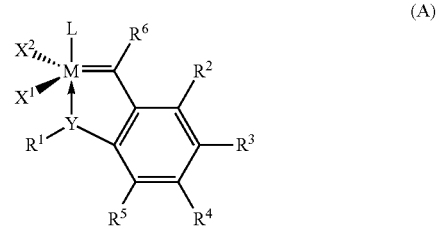

wherein
M is osmium or ruthenium,
X$^1$ and X$^2$ are identical or different anionic ligands,
L is a ligand, preferably an uncharged electron donor,
Y is oxygen (O), sulphur (S), an N—R$^1$ radical or a P—R$^1$ radical, where R$^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, and $R^6$ is hydrogen or an alkyl, alkenyl, alkynyl or aryl radical, characterized in that such catalyst of the general formula (A) is added in solid form to the aqueous suspension of the diene-based polymer.

DETAILED DESCRIPTION OF THE INVENTION

The process of the present invention allows a selective hydrogenation of the carbon-carbon double bonds in a diene-based polymer while the double bonds in aromatic or naphthenic groups are not hydrogenated and double or triple bonds between carbon and other atoms such as nitrogen or oxygen are also not affected. The hydrogenation can be performed with high degrees of hydrogenation within short reaction times and without the formation of gel which has been observed in prior art processes due to unwanted crosslinking. Advantageously and most importantly no parallel metathesis reaction is observed although the catalysts of general formula (A) are principally known for their metathetic activity resulting in molecular weight degradation of polymers if used in organic solution. A further advantage of the present process resides in the fact that the catalyst of general formula (A) can be added as a solid to the reaction mixture, this means that no organic solvent at all needs to be used or needs to be present during the hydrogenation according to the present invention. Additionally no further co-catalysts are needed and preferably the process of the present invention is performed in the absence of any co-catalyst.

Catalysts to be Used in the Process According to the Invention:

The process according to the present invention is conducted in the presence of at least one catalyst having the general formula (A)

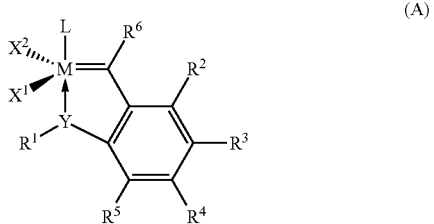

wherein

M is osmium or ruthenium, $X^1$ and $X^2$ are identical or different anionic ligands, L is a ligand, preferably an uncharged electron donor, Y is oxygen (O), sulphur (S), an N—$R^1$ radical or a P—$R^1$ radical, where $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, and $R^6$ is hydrogen or an alkyl, alkenyl, alkynyl or aryl radical.

Such catalyst of general formula (A) is typically water-insoluble. In the context of this application "water-insoluble" means that 0.001 or less parts by weight can be completely dissolved in 100 parts by weight of water at 24+/−2° C., while a catalyst is considered as "water-soluble" if more than 0.5 parts by weight can be completely dissolved in 100 parts by weight of water at 24+/−2° C.

$X^1$ and $X^2$:

In the catalysts of the general formula (A), $X^1$ and $X^2$ are identical or different and represent anionic ligands.

In one embodiment of the catalysts of general formula (A) $X^1$ represents hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The abovementioned moieties listed as meanings for $X^1$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ is halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{14}$-arylthiol, $C_6$-$C_{14}$-aryl or $C_1$-$C_5$-alkylsulfonate.

In a particularly preferred embodiment, $X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$).

L:

In the general formulae (A), the symbol L represents a ligand and is preferably an uncharged electron donor.

The ligand L can, for example, be a phosphine, sulphonated phosphine, phosphate, phosphinite, phosphonite, arsine, stibine, ether, amine, amide, sulphoxide, carboxyl, nitrosyl, pyridine, thioether or a N-heterocyclic carbene ligand.

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S$ (=O) and $(C_6H_5)_2S$=O.

The term "thioether" includes, for example, $CH_3SCH_3$, $C_6H_5SCH_3$, $CH_3OCH_2CH_2SCH_3$ and et altetrahydrothiophene.

For the purposes of the present application, the term "pyridine-based ligands" is used as a collective term for all pyridine-based ligands or derivatives thereof as mentioned, for example, in WO-A-03/011455. The term "pyridine-based ligands" hence includes pyridine itself, picolines (like α-, β- and γ-picoline), lutidines (like 2,3-, 2,4-, 2,5-, 2,6-, 3,4- and 3,5-lutidine), collidine (namely 2,4,6-trimethylpyridine), trifluoromethyl-pyridine, phenylpyridine, 4-(dimethylamino)-pyridine, chloropyridines, bromopyridines, nitropyridines, quinoline, pyrimidine, pyrrole, imidazole and phenylimidazole.

If L represents a phosphine as electron-donating ligand in general formula (A) such phosphine preferably has the general formula (IIf)

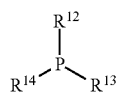
(IIf)

wherein $R^{12}$, $R^{13}$ and $R^{14}$ are identical or different, even more preferably identical, and can represent $C_1$-$C_{20}$ alkyl, preferably methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, or neophenyl, $C_3$-$C_8$-cycloalkyl, preferably cyclopropyl, cyclobutyl, cyclopentyl, cyclohexyl, cycloheptyl or cyclooctyl, $C_1$-$C_{20}$ alkoxy, substituted or unsubstituted $C_6$-$C_{20}$ aryl, preferably phenyl, biphenyl, naphthyl, phenanthrenyl, anthracenyl, tolyl, 2,6-dimethylphenyl, or trifluoromethyl, $C_6$-$C_{20}$ aryloxy, $C_2$-$C_{20}$ heteroaryl with at least one heteroatom in the cycle, a $C_2$-$C_{20}$ heterocyclyl with at least one heteroatom in the cycle or halogen, preferably fluoro;

If L represents a phosphine of general formula (IIf) as electron-donating ligand in general formula (A) or (B) such phosphine preferably represents $PPh_3$, $P(p$-$Tol)_3$, $P(o$-$Tol)_3$, $PPh(CH_3)_2$, $P(CF_3)_3$, $P(p$-$FC_6H_4)_3$, $P(p$-$CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ or $P(neophenyl)_3$, wherein Ph means phenyl and Tol means tolyl.

The N-heterocyclic carbene ligand represents a cyclic carbene type ligand with at least one nitrogen as hetero atom being present in the ring. The ring can exhibit different substitution patterns on the ring atoms. Preferably this substitution pattern provides a certain degree of steric crowding.

In the context of this invention the N-heterocyclic carbene ligand (hereinafter referred to as "NHC-ligand") is preferably based on imidazoline or imidazolidine moieties.

The NHC-ligand typically has a structure corresponding to the general formulae (IIa) to (IIe)

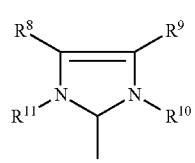
(IIa)

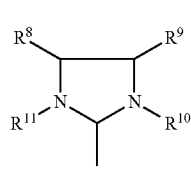
(IIb)

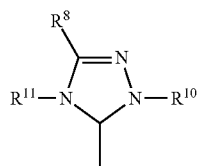
(IIc)

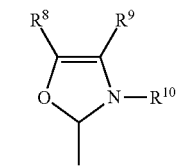
(IId)

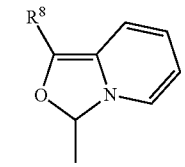
(IIe)

wherein $R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$ aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

In these formulae (IIa) to (IIe) the carbon atom bonding to the Ruthenium metal center is formally a carbene carbon.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy, $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein the abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the NHC-ligand depicted in the general formulae (IIa) and (IIb) in the present patent application are equivalent to the structures (IIa-(i)) and (IIb-(i)) which are frequently also found in the literature for such NHC-ligands, respectively, and emphasize the carbene character of the NHC-ligand. This applies analogously to the further structures (IIc) to (IIe) as well as the associated preferred structures (IIIa)-(IIIu) depicted below.

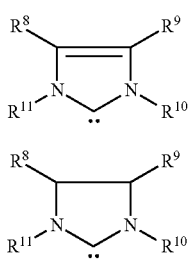

In a preferred NHC-ligand in the catalysts of the general formula (A)
$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, i-butyl or tert.-butyl or form a cycloalkyl or aryl structure together with the carbon atoms to which they are bound.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_3$-alkoxy and phenyl.

In a further preferred NHC-ligand in the catalysts of the general formula (A)
$R^{10}$ and $R^{11}$ identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

These preferred meanings of $R^{10}$ and $R^{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In a further preferred NHC-ligand in the catalysts of the general formula (A)
$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, propyl, n-butyl, sec-butyl, and i-butyl, or form a cycloalkyl or aryl structure together with the carbon atoms to which they are bound, and
$R^{10}$ and $R^{11}$ are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, alkylsulfonate, or $C_6$-$C_{10}$-arylsulfonate.

Particularly preferred NHC-ligands have the following structures (IIIc) to (IIIu), where "Ph" means in each case phenyl, "Bu" means in each case butyl, i.e. either n-butyl, sec.-butyl, iso-butyl or tert.-butyl, "Mes" represents in each case 2,4,6-trimethylphenyl, "Dipp" means in all cases 2,6-diisopropylphenyl and "Dimp" means in each case 2,6-dimethylphenyl.

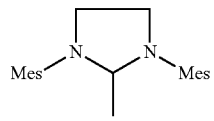
(IIIa)

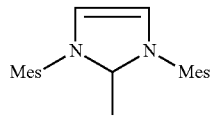
(IIIb)

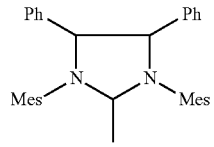
(IIIc)

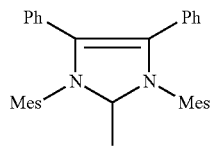
(IIId)

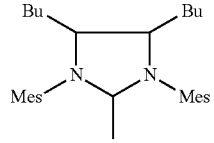
(IIIe)

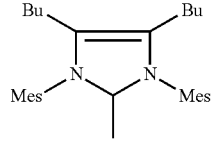
(IIIf)

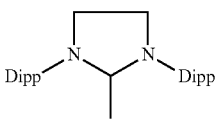
(IIIg)

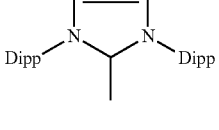
(IIIh)

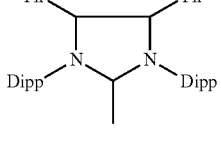
(IIIj)

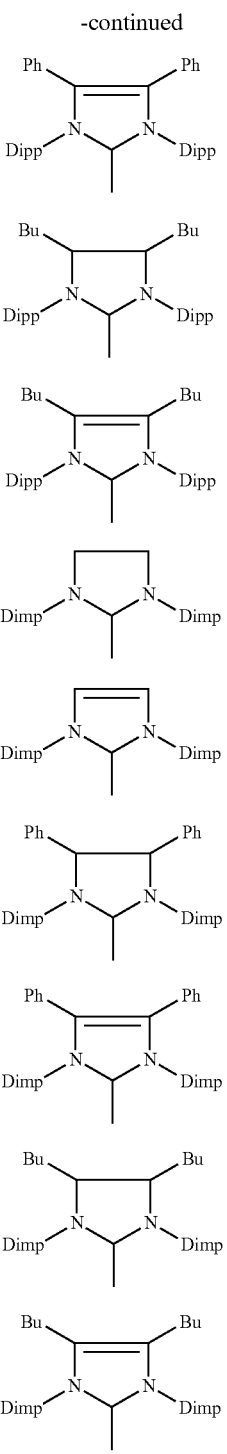

Where the NHC-ligand contains not only an "N" (nitrogen), but also an "O" (oxygen) in the ring it is preferred that the substitution pattern of $R^8$, $R^9$, $R^{10}$ and/or $R^{11}$ provides a certain steric crowding.

In the general formula (A), the substituent $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals.

The substituent $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical which may in each case optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, with the latter being able, if appropriate, to be interrupted by one or more double or triple bonds or one or more heteroatoms, preferably oxygen or nitrogen. $R^1$ is particularly preferably a straight-chain or branched $C_1$-$C_{12}$-alkyl radical.

$C_3$-$C_{20}$-Cycloalkyl radicals encompass, for example, cyclopropyl, cyclobutyl, cyclopentyl, cyclohexyl, cycloheptyl and cyclooctyl.

A $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

A $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (A), the radicals $R^2$, $R^3$, $R^4$ and $R^5$ are identical or different and can each be hydrogen or an organic or inorganic radical.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may be in each case optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_3$-$C_{30}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl which may in each case optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, straight-chain or branched $C_1$-$C_{30}$-alkyl, $C_5$-$C_{20}$-cycloalkyl, straight-chain or branched $C_1$-$C_{20}$-alkoxy or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

In the general formula (A), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Particular preference is given to the catalyst having the structure (IV) (the so called Hoveyda-Grubbs catalyst), where Mes is mesityl.

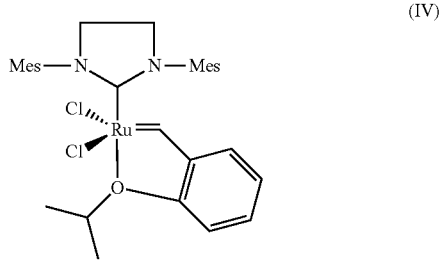

(IV)

Diene-Based Polymers to be Subjected to Hydrogenation:

Suitable substrates for the hydrogenation process of the present invention are in principle all aqueous suspensions of diene-based polymers which are also called "latex". Such diene-based polymers contain carbon-carbon double bonds. These latices include both suspensions prepared by free-radical polymerization of aqueous monomer emulsions (primary suspensions) and those whose polymers have been prepared by whatever method or route and are then converted to an aqueous suspension form (secondary suspensions). The term "aqueous suspension" also embraces, in principle, suspensions of microcapsules.

Polymers having carbon-carbon double bonds which may be subjected to the inventive process comprise repeating units based on at least one conjugated diene monomer.

The conjugated diene can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Especial preference is given to 1,3-butadiene.

In a further embodiment polymers having carbon-carbon double bonds may be subjected to the inventive process which comprise repeating units of not only at least one conjugated diene as monomer (a) but additionally at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched $C_1$-$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

A preferred polymer to be used in the present invention is a copolymer of 1,3-butadiene and styrene or alpha-methylstyrene. Said copolymers may have a random or block type structure.

Further suitable copolymers have repeating units derived from at least one conjugated diene and from at least one monomer (b) selected from the group consisting of esters of ethylenically unsaturated mono- or dicarboxylic acids such as acrylic acid, methacrylic acid, maleic acid, fumaric acid and itaconic acid with generally $C_1$-$C_{12}$ alkanols, such as methanol, ethanol, n-propanol, isopropanol, 1-butanol, 2-butanol, isobutanol, tert.-butanol, n-hexanol, 2-ethylhexa-nol, or $C_5$-$C_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Suitable further copolymerizable monomers (b) are α,β-unsaturated nitriles. It is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A suitable copolymer to be used in the present invention is a so called nitrile rubber (also abbreviated as "NBR") this being a copolymer having repeating units of at least one conjugated diene, preferably 1,3-butadiene, at least one α,β-unsaturated nitrile, preferably acrylonitrile, and optionally one or more further copolymerizable monomers.

A particularly preferred nitrile rubber is thus a copolymer having repeating units derived from acrylonitrile and 1,3-butadiene.

Apart from the conjugated diene and the α,β-unsaturated nitrile, the nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono- or diesters, as well as the respective anhydrides or amides of said α,β-unsaturated dicarboxylic acids.

As α,β-unsaturated monocarboxylic acids acrylic acid and methacrylic acid are preferred termonomers of such nitrile rubbers.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethylhexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-cycloalkyl-, more preferably $C_6$-$C_{12}$-cycloalkyl and most preferably the aforementioned cycloalkyl acrylates and methacrylates are used.

It is also possible to use cyanoalkyl esters, in particular cyanoalkyl acrylates or cyanoalkyl methacrylates, in which the number of C atoms in the cyanoalkyl group is in the range of from 2 to 12, preferably α-cyanoethyl acrylate, β-cyanoethyl acrylate or cyanobutyl methacrylate are used.

In another embodiment hydroxyalkyl esters are used, in particular hydroxyalkyl acrylates and hydroxyalkyl methacrylates in which the number of C-atoms in the hydroxylalkyl group is in the range of from 1 to 12, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. polyethyleneglycol(meth)acrylate, polypropyleneglycole(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analogous diesters based on the above explicitely mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Composition of Co- and Terpolymers to be Subjected to the Present Process:

In case that the polymer to be subjected to the present process comprises not only repeating units of one or more conjugated dienes, but also repeating units of one or more further copolymerizable monomers, the proportions of conjugated diene(s) and the other copolymerizable monomers may vary within wide ranges:

In case of NBR polymers being used in the present process the proportion of or of the sum of the conjugated dienes is usually in the range from 40 to 90% by weight, preferably in the range from 50 to 85% by weight, based on the total polymer. The proportion of or of the sum of the α,β-unsaturated nitriles is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional termonomers, with the proportions of all monomers in each case adding up to 100% by weight.

The preparation of nitrile rubbers by polymerization of the abovementioned monomers is adequately known to those skilled in the art and is comprehensively described in the polymer literature.

The nitrile rubbers used pursuant to this invention have a Mooney viscosity (ML 1+4 at 100° C.) in the range from 25 to 70, preferably from 30 to 50. This corresponds to a weight average molecular weight $M_w$ in the range 200,000-500,000, preferably in the range 200,000-400,000. A nitrile rubber having a Mooney viscosity of about 34 e.g. has an intrinsic viscosity, determined in chlorobenzene at 35° C., of about 1.1 dL/g. The nitrile rubbers used also have a polydispersity PDI=$M_w/M_n$, where $M_w$ is the weight average molecular weight and $M_n$ is the number average molecular weight, in the range of from 2.0 to 6.0 and preferably in the range 2.0-4.0. The determination of the Mooney viscosity is carried out in accordance with ASTM standard D 1646.

If a polymer is used in the present invention which contains repeating units of one or more conjugated dienes and optionally one or more other copolymerizable monomers like e.g. styrene or alpha-methylstyrene the proportion of the conjugated diene(s) is usually from 15 to 100% b.w. and the proportion of or of the sum of the copolymerizable termonomer(s) is from 0 to 85% b.w. If as other copolymerizable monomers styrene or alphamethyl styrene are used, the proportion of styrene and/or a methyl styrene is preferably from 15 to 60% b.w., while the remainder to 100% b.w. is represented by the conjugated diene(s).

The carbon-carbon double bond containing polymer in the latex form useful in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process as this process directly yields the latex form of the polymer.

Preferably, according to the present invention, the polymer solid content in the aqueous emulsion lies in the range of from 1 to 75% by weight, more preferably from 5 to 30% by weight based on the total weight of the aqueous emulsion.

The preparation of such polymers which are subjected to the process pursuant to this invention is known to the skilled worker and can in principle be carried out by anionic, free-radical or Ziegler-Natta polymerization in solution, in bulk, in suspension or in emulsion. Depending on the type of reaction, the conjugated diener are 1,4- and/or 1,2 polymerized. For the hydrogenation process of the invention it is preferred to employ polymers prepared by free-radical aqueous emulsion polymerization of the above mentioned monomers (a) and (b). These techniques are sufficiently well known to the skilled worker and are described at length in the literature, for example in Ullmann's Encyclopedia of Industrial Chemistry, $5^{th}$ Edition, Volume A 21, pp 373-393. In general such polymers are prepared in the presence of free-radical initiators and, if desired, surface-active substances such as emulsifiers and protective colloids (see for example Houben Weyl, Methoden der organischen Chemie, Volumen XIV/1, Makromolekulare Stoffe, Georg Thieme Verlag, Stuttgart, 1961, pp 192-208).

Suitable free-radical polymerization initiators include organic peroxides, such as tert-butyl hydroperoxide, benzoyl hydroperoxide, diisopropylbenzoyl peroxide, inorganic peroxides, such as hydrogen peroxide, salts of peroxomono and/or peroxodisulfuric acid, especially the ammonium and/or alkali metal peroxodisulfates (persulfates), and azo compounds, particular preference being given to the persulfates. Preference is also given to combined systems composed of at least one organic reducing agent and at least one peroxide and/or hydroperoxide, such as tert-butyl hydroperoxide and the sodium salt of hydroxymethanesulfonic acid, or hydrogen peroxide and ascorbic acid (as an electrolyte-free redox initiator system) and to combine systems which additionally comprise a small amount of a metal compound which is soluble in the polymerization medium and whose metallic component can exist in a plurality of valence states, for example ascorbic acid/iron(II) sulfate/hydrogen peroxide, it also being possible frequently to replace the ascorbic acid byx the sodium salt of hydroxymethanesulfinic acid, sodium sulfite, sodium hydrogensulfite or sodium bisulfite and the hydrogen peroxide by tert-butyl hydroperoxid, alkali metal peroxodisulfates and/or ammonium peroxodisulfate. Instead of a water-soluble iron(II) salt it is also possible to employ a combination of water-soluble Fe/V salts.

These polymerization initiators are employed in customary amounts, such as in amounts of from 0.01 to 5, preferably from 0.1 to 2.0% b.w., based on the monomers to be polymerized.

The monomer mixtures can, if desired, be polymerized in the presence of customary regulators, such as mercaptans, an example of which is tert.-dodecyl mercaptan. These regulators are then used in an amount of from 0.01 to 5% b.w., based on the overall amount of the mixture.

There are no particular restrictions on the emulsifiers that can be used. Preference is given to neutral emulsifiers such as ethoxylated mono, di- and trialkylphenols (ethyleneoxide degree: 3 to 50; Alkyl $C_4$ to $C_9$) or ethoxylated fatty alcohols (ethyleneoxide degree: 3 to 50; alkyl $C_4$ to $C_9$) and/or anionic emulsifiers, such as the alkali metal and ammonium salts of fatty acids (alkyl: $C_{12}$ to $C_{24}$), of alkyl sulfates (alkyl: $C_8$ to $C_{22}$), of sulfuric monoesters of ethoxylated alkanols (ethyleneoxide degree: 4 to 30, alkyl: $C_8$ to $C_{22}$) and of ethoxylated alkylphenols (ethyleneoxide degree: 3 to 50, alkyl: $C_4$ to $C_{20}$), of alkylsulfonic acids (alkyl: $C_8$ to $C_{22}$) and of alkylarylsulfonic acids (alkyl: $C_4$ to $C_{18}$). Further suitable anionic emulsifiers are alkali metal or ammonium salts of mono- or di-$C_{4-24}$ alkyl derivatives of bis(phenylsulfonic acid)ether.

Particular preference is given to the alkali metal and/or ammonium salts, especially the sodium salts, of alkylarylsulfonic acids, alkylsulfonic acids (eg. sulfonated $C_{12}$-$C_{18}$ paraffin), alkylsulfates (eg. sodium lauryl sulfonate) and of the sulphuric monoesters of ethoxylated alkanols (eg. sulfoxylated ethoxylate of lauryl alcohol with 2 to 3 ethyleneoxide units). Further suitable emulsifiers are the sodium or potassium salts of fatty acids ($C_{12}$-$C_{23}$-alkyl radicals), such as potassium oleate. Additional appropriate emulsifiers are given in Houben-Weyl, loc. Cit., pp. 192-208. Instead of or in a mixture with emulsifiers it is also possible, however, to employ conventional protective colloids, such as polyvinyl alcohol, polyvinylpyrrolidone or amphiphilic block polymers with short hydrophobic blocks, for the purpose of co-stabilization. In general the amount of emulsifiers used, based on the monomers to be polymerized, will not exceed 5% by weight.

The free-radical polymerization reaction can be carried out by the whole-batch initial charge (batch) technique, but is preferably operated, especially on the industrial scale, in accordance with the feed technique. In this latter technique the major amount (generally from 50 to 100% by weight) of the monomers to be polymerized are added to the polymerization vessel in accordance with the progress of the polymerization of the monomers already in the polymerization vessel. In this context; the free-radical initiator system can be either included entirely in the initial charge to the polymerization vessel or else added continuously or in stages to the polymerization reaction at the rate at which it is consumed in the course of the free-radical aqueous emulsion polymerization. In each individual case this will depend, as is known, both on the chemical nature of the initiator system and on the polymerization temperature. The initiator system is preferably supplied to the polymerization zone at the rate at which it is consumed.

The polymerization reaction may also be conducted in the presence of an aqueous polymer suspension as polymer (seed latex). Such techniques are fundamentally known to the skilled worker and are described for example, in DE-A 42 13 967, DE-A 42 13 968, EP-A 567 811, EP 567 812 or EP 567 819, which are incorporated fully herein by reference. In principle it is possible depending on the desired character, to include the seed in the initial charge or to add it continuously or in stages in the course of polymerization. The polymerization is preferably carried out with the seed in the initial charge. The amount of seed polymer is preferably in the range from 0.05 to 5% by weight, preferably from 0.1 to 2% by weight and, in particular, from 0.2 to 1% by weight, based on the monomers a) to d). The polymer particles of the seed latex that is used preferably have weight-average diameters in the range from 10 to 100 nm, preferably from 20 to 60 nm and in particular, about 30 nm. Preference is given to the use of a polystyrene seed.

The polymerization reaction is preferably carried out above atmospheric pressure. The polymerization time can vary within a wide range, and is generally from 1 to 15 hours, preferably from 3 to 10 hours. The temperature of polymerization is also variable a wide range and, depending on the initiator used, is from about 0 to 110° C.

The polymer suspensions prepared in this way generally have solid contents of up to 75% by weight. For use in the hydrogenation process of the invention it is possible to employ the suspensions with these solid contents. In some cases, however, it is advisable to dilute the suspensions to an appropriate solid content beforehand. The solid content of the suspensions employed is preferably in the range from 5 to 30% by weight, based on the overall weight of suspension.

The surface-active substances still present, in general, in the polymer suspensions, and further substances used, for example, as customary polymerization auxiliaries in emulsion polymerizations, do not have a disruptive effect on the hydrogenation process of the invention. However, it is advisable to subject the polymer suspensions to chemical or physical deodorization before hydrogenation. Physical deodorization, by stripping the residual monomers with steam, is known, for example, from EP-A 584 458. EP-A 327 006 for its part recommends the use of conventional distillation methods. Chemical deodorization takes place preferably by means of a post polymerization following the main polymerization. Such processes are described, for example, in DE-A 383 4734, EP-A 379 892, EP-A 327 006, DE-A 44 19 518, DE-A 44 35 422 and DE-A 44 35 423.

Preferably, according to the present invention, the content of the diene-based polymer in the aqueous suspension lies in the range of from 1 to 75% by weight, more preferably from 5 to 30% by weight based on the total weight of the latex.

Process According to the Present Invention:

Hydrogenation in this invention is understood by preferably at least 50% of the residual double bonds (RDB) present in the starting diene-based polymer being hydrogenated, preferably 70-100%, more preferably 80-100%, even more preferably 90-100% and most preferably 95-100%.

In the process of the present invention of from 0.01 to 5.0% by weight, preferably of from 0.02% to 2.0% by weight of the catalyst according to general formula (A) are typically used, based on the weight of the diene-based polymer present in the aqueous medium.

The hydrogenation is typically carried out at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

Preferably, the hydrogenation time of the diene-based polymer is from 10 minutes to 24 hours, preferably from 15 minutes to 20 hours, more preferably from 30 minutes to 4 hours, even more preferably from 1 hour to 8 hours and most preferably from 1 hour to 3 hours.

Typically the catalyst of general formula (A) is dosed in solid form into the aqueous suspension containing the diene-based polymer to be subjected to the hydrogenation and the hydrogenation can therefore be performed in the absence of any organic solvent.

EXAMPLES

The following examples with the experimental conditions shown below illustrate the scope of the invention and are not intended to limit the same. The materials used in the hydrogenation reaction are listed in Table 1.

TABLE 1

Specification of the Materials

| Materials | Supplier |
| --- | --- |
| Latex of a butadiene-acrylonitrile copolymer ("NBR"); NBR solid content of 19.5 wt % in water, the copolymer containing 66% butadiene and 34% acrylonitrile; mean diameter of the polymer particles in the latex: about 72 nm. | LANXESS Emulsion Rubber S.A. |
| Grubbs II catalyst (G2) 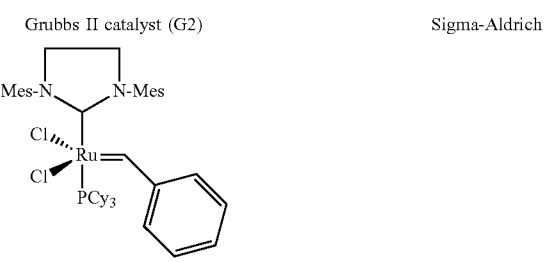 | Sigma-Aldrich |

TABLE 1-continued

Specification of the Materials

| Materials | Supplier |
| --- | --- |
| Hoveyda-Grubbs catalyst, second generation (HG2) | Sigma-Aldrich |

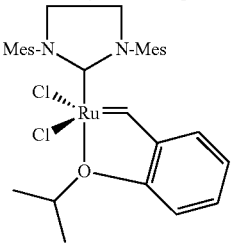

| hydrogen (99.999%) | Praxair |
| nitrogen (99.99%) | Praxair |
| methyl ethyl ketone (99%) | Sigma-Aldrich |

Example 1-8: Direct Hydrogenation of the Polymer Latex

Example 1

The hydrogenation reaction was carried out in a 300 mL Parr 316 Stainless Steel reactor. First 25 ml of the NBR latex identified in Table 1 and 75 ml water were charged into the reactor. The solid HG2 catalyst (0.00487 g) was placed in a catalyst addition device which was installed in the head of the reactor. After assembling the reactor, the NBR latex was degassed by bubbling nitrogen gas under about 200 psi (1.38 MPa) for 20 min at room temperature and the system was then heated to 100° C. Then, the catalyst was added into the NBR latex with 1000 psi (6.89 MPa) hydrogen gas. The hydrogen pressure and reaction temperature were kept constant throughout the reaction period. The hydrogenated NBR latex was sampled through a dip tube into the reactor at intervals during the reaction. The hydrogenation result is shown in Table 2. After 4 hours, the hydrogenation degree reaches 98%. No visible gel was generated and the resultant hydrogenated NBR ("HNBR") polymer was tested to be easily soluble in methyl ethyl ketone. The molecular weight of HNBR is 249,000 with a PDI of 3.1. The molecular weight change is solely caused by hydrogenation.

Comparative Example 1a: Grubbs II Catalyst

The same reactor and NBR latex was used in the comparative example 1a except that Grubbs II catalyst (G2, 0.0066 g) was used instead of HG2 catalyst. The hydrogenation degree reached 15% after 4 hours. A further extension of the hydrogenation period to 10 hours resulted in a hydrogenation degree of 22%. No further increase of the hydrogenation degree could be achieved.

Example 2

The same procedure as described in example 1 was employed except that only 0.00244 g of HG2 catalyst were added. After 19 hours, a hydrogenation degree of 90% was achieved without any visible gel.

Example 3

The same procedure as described in example 1 was employed except that the reaction temperature was increased to 120° C. After 1.6 hours, a hydrogenation degree of 98% was achieved and no visible gel was generated.

Example 4

The same procedure as described in example 3 was employed except that a higher catalyst loading (0.00975 g) was used. After 0.5 hours, a hydrogenation degree of 98% was achieved and no visible gel was generated.

Example 5

The same procedure as described in example 3 was employed except that a smaller amount of HG2 catalyst (0.00125 g) was used. After 10 hours, a hydrogenation degree of 74% was achieved and no visible gel was generated.

Example 6

The same procedure as described in example 1 was employed except that a lower hydrogen pressure (500 psi; 3.45 MPa) was used. After 10 hours, a hydrogenation degree of 99% was achieved and no visible gel was generated.

Example 7

The same procedure as described in example 3 was employed. However, a higher hydrogen pressure (1500 psi; 10.34 MPa) was used at 120° C. After 9 hours, a hydrogenation degree of 99% was achieved and no visible gel was generated.

Example 8

100 ml NBR latex and 0.01253 g of HG2 catalyst were used. No extra water was added to dilute the NBR latex. All other reaction parameters were the same as described in Example 1. After 3 hours, a hydrogenation degree of 99% was achieved and no visible gel was generated.

TABLE 2

Hydrogenation of NBR in latex[a]

| Example | Catalyst (g) | T (° C.) | $P_{H2}$ (MPa) | Time (h) | Conversion[b] (mol %) | TOF[c] ($h^{-1}$) |
|---|---|---|---|---|---|---|
| 1 | 0.00487 | 100 | 6.89 | 4 | 98 | 1810 |
| 1a | 0.00660 | 100 | 6.89 | 10 | 22 | 724 |
| 2 | 0.00244 | 100 | 6.89 | 19 | 90 | 760 |
| 3 | 0.00488 | 120 | 6.89 | 1.6 | 98 | 4514 |
| 4 | 0.00975 | 120 | 6.89 | 0.5 | 98 | 7222 |
| 5 | 0.00125 | 120 | 6.89 | 10 | 74 | 2817 |
| 6 | 0.00487 | 100 | 3.45 | 10 | 99 | 722 |
| 7 | 0.00245 | 120 | 10.34 | 9.0 | 95 | 1558 |
| 8 | 0.01253 | 100 | 6.89 | 3 | 99 | 4827 |

[a]25 ml NBR latex with solid content 19.5% (wt/wt), extra water: 75 ml; except Ex. 8 (100 ml NBR latex, no extra water)
[b]conversions determined by FT-IR;
[c]Defined as mole of hydrogenated C = C units in the NBR per mole of catalyst added per hour

The invention claimed is:

1. A process for preparing a hydrogenated diene-based polymer, the process comprising subjecting a diene-based polymer in an aqueous suspension to a hydrogenation in the presence of a catalyst of the general formula (A)

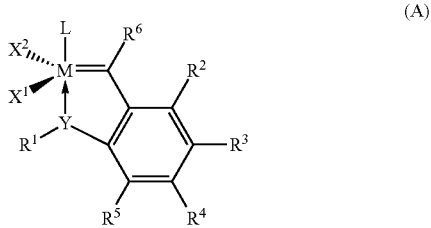

(A)

wherein
M is osmium or ruthenium,
$X^1$ and $X^2$ are identical or different anionic ligands,
L is a ligand selected from the group consisting of arsine, stibine, ether, amine, sulphoxide, carboxyl, nitrosyl, pyridine, thioether, and N-heterocyclic carbene ligands,
Y is oxygen (O), sulphur (S), an N—$R^1$ radical or a P—$R^1$ radical, where $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical, and
$R^6$ is hydrogen or an alkyl, alkenyl, alkynyl or aryl radical,
wherein the catalyst of the general formula (A) is added in solid form to the aqueous suspension of the diene-based polymer.

2. The process according to claim 1, wherein the diene-based polymer contains repeating units of at least one ($C_4$-$C_6$) conjugated diene.

3. The process according to claim 2, wherein the diene-based polymer additionally contains repeating units of at least one further copolymerizable monomer (b).

4. The process according to claim 3, wherein the diene-based polymer is a copolymer of 1,3-butadiene and acrylonitrile.

5. The process according to claim 1, wherein the catalyst is a catalyst having the structure (IV)

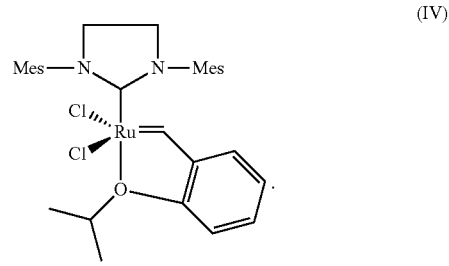

(IV)

6. The process according to claim 1, wherein the hydrogenation is carried out at a temperature 60° C. to 200° C. and at a hydrogen pressure of 0.5 MPa to 35 MPa.

7. The process according to claim 1, wherein the diene-based polymer is hydrogenated in the presence of 0.01 to 5.0 wt % of the catalyst of general formula (A) based on the weight of the diene-based polymer in the aqueous suspension.

8. The process according to claim 1, wherein the hydrogenation is done in the absence of any organic solvent.

9. The process according to claim 1, wherein the diene-based polymer contains repeating units of at least one ($C_4$-$C_6$) conjugated diene selected from the group consisting of 1,3-butadiene, isoprene, 1-methylbutadiene, 2,3-dimethylbutadiene, piperylene, chloroprene, and mixtures thereof.

10. The process according to claim 9, wherein:
the hydrogenation is carried out at a temperature 100° C. to 160° C. and at a hydrogen pressure of 3.0 MPa to 10 MPa, and in the absence of any organic solvent;
the diene-based polymer is hydrogenated in the presence of 0.02 to 2.0 wt % of catalyst based on the weight of the diene-based polymer present in the aqueous suspension;
the diene-based polymer is a copolymer of 1,3-butadiene and acrylonitrile; and
the catalyst is a catalyst having the structure (IV)

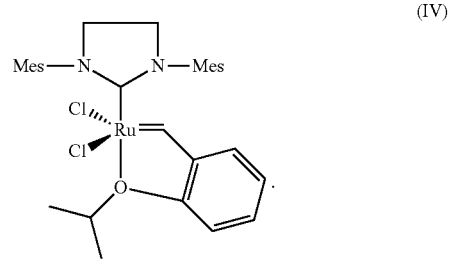

(IV)

* * * * *